United States Patent
Hossain et al.

[11] Patent Number: 6,134,576
[45] Date of Patent: Oct. 17, 2000

[54] PARALLEL ADDER WITH INDEPENDENT ODD AND EVEN SUM BIT GENERATION CELLS

[75] Inventors: Razak Hossain, Bridgewater; Roland A. Bechade, Branchburg, both of N.J.; Jeffrey C. Herbert, Nazareth, Pa.

[73] Assignee: Mentor Graphics Corporation, Wilsonville, Oreg.

[21] Appl. No.: 09/071,383

[22] Filed: Apr. 30, 1998

[51] Int. Cl.[7] ...................................................... G06F 7/50
[52] U.S. Cl. ........................................... 708/710; 708/714
[58] Field of Search ................................... 708/700, 706, 708/710, 711, 712, 713, 714

[56] References Cited

U.S. PATENT DOCUMENTS

| | | |
|---|---|---|
| 3,636,334 | 1/1972 | Svoboda . |
| 3,700,875 | 10/1972 | Saenger et al. . |
| 3,987,291 | 10/1976 | Gooding et al. . |
| 4,879,677 | 11/1989 | Shiraishi . |
| 5,128,892 | 7/1992 | Ullrich . |
| 5,278,783 | 1/1994 | Edmondson ............................ 708/711 |
| 5,396,445 | 3/1995 | Lal .......................................... 708/714 |
| 5,500,813 | 3/1996 | Song et al. ............................. 708/712 |
| 5,631,860 | 5/1997 | Morinaka ................................ 708/710 |

OTHER PUBLICATIONS

Davide Dozza et al., "A 3.5 NS, 64 Bit, Carry–Lookahead Adder", Proceedings of the 1996 IEEE International Symposium on Circuits and Systems, vol. 2, May 12–15, 1996, pp. 297–300.

*Primary Examiner*—Ohuong Dinh Ngo
*Attorney, Agent, or Firm*—Blakely Sokoloff Taylor & Zafman, LLP

[57] ABSTRACT

A parallel adder is disclosed. The parallel adder includes a number of computational cells that operate to generate odd sum bits based on generate and propagate terms recursively computed and a plurality of carry-in bits. The parallel adder further includes a number of selection cells that are independent of the computational cells and operate to select and output even sum bits from a number of candidate sum bits, the selection being made in accordance with predetermined ones of said recursively computed generate and propagate terms.

15 Claims, 9 Drawing Sheets

PARALLEL ADDER WITH INDEPENDENT ODD AND EVEN SUM BIT GENERATION CELLS

BACKGROUND OF THE INVENTION

1. Field of the Invention

The present invention relates to the field of digital data processing. More specifically, the present invention relates to the design of high speed parallel adder in a digital data processor.

2. Background Information

Addition is one of the essential tasks repeatedly performed by a digital data processor. As a result, the adder is an essential part of a digital data processor. In addition to being used to perform addition, often times, the adder is also an integral part of the multiplier, playing an important role in the performance of multiplication. Thus, much effort has been expanded to try to maximize the speed of adders, and any further improvement on the speed of adders is desirable.

Numerous schemes for performing high speed addition had been proposed. One such scheme was proposed by Dozza et al. during the 1996 IEEE International Symposium on Circuits and Systems, held in Atlanta, Ga., May 12–15, 1996. The presentation was entitled "A 3.5 ns, 64 bit, carry-lookahead adder". Briefly, Dozza's proposal extends the work of Brent and Kung, which opened the way to a class of carry-lookahead adders based on a binary tree structure. Under Dozza's approach, a compact array of cells, each implementing what's known as the "O" operator, are interconnected in accordance with a particular binary tree structure. The tree structure is shown in FIG. 1$b$ of an article subsequently published as part of the proceeding of the conference. The sum and the carry out bits are computed in accordance with the equations:

$$s_i = p_i \text{XOR } c_{i-1}, \text{ and } c_i = g_i + p_i c_{i-1},$$

where $g_i = a_i b_i$ and $p_i = a_i \text{XOR } b_i$ $a_i$ and $b_i$ are inputs to the adders, and $g_i$ and $p_i$ are generate and propagate bits.

The generate and propagate bits are recursively calculated with $$g_{ik} = g_{j+1,k} + p_{j+1,k} g_{ij} \text{ and } p_{ik} = p_{ij} p_{j+1,k}$$

for i<j and j+1<k. Dozza's approach was able to reduce the length of the critical path to $\log_2 n$ logical levels (as opposed to the requirement of $2\log_2(n-1)$ logical levels under Brent and Kung), while keeping the fan-out down to 2 for each cell. Brent and Kung's work are described in R. P. Brent and H. T. Kung, "A Regular Layout for Parallel Adders", IEEE Trans. Comput., vol. C-31, no. 3, pp. 260–264, March 1982."

The present invention further improves on Dozza's approach.

SUMMARY OF THE INVENTION

A parallel adder is disclosed. The parallel adder includes a number of computational cells that operate to generate odd sum bits based on generate and propagate terms recursively computed and a plurality of carry-in bits. The parallel adder further includes a number of selection cells that are independent of the computational cells and operate to select and output even sum bits from a number of candidate sum bits, the selection being made in accordance with predetermined ones of said recursively computed generate and propagate terms.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
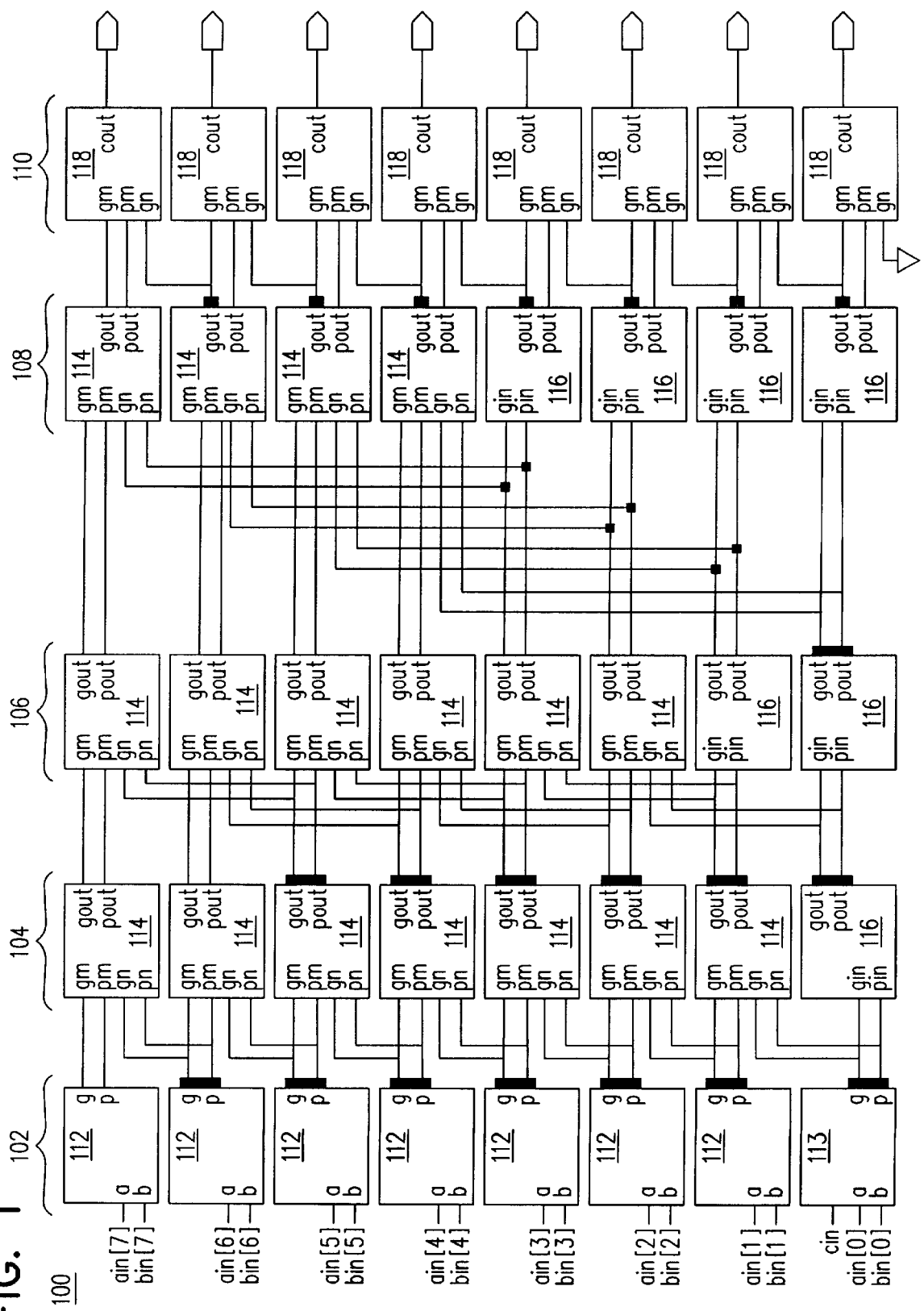
FIGS. 1–5 illustrate an 8-bit embodiment of a parallel adder in accordance with a straight implementation of Dozza's approach, including an architectural view and detailed views of the various cells.

Referring now FIGS. 1–5, wherein six diagrams are shown illustrating an 8-bit embodiment of a parallel adder in accordance with a straight implementation of Dozza's approach. As shown in FIG. 1, 8-bit parallel adder 100 implemented straightly in accordance with Dozza's approach includes a column of input XOR gates (not shown), five columns of computational cells, columns 102–110, (hereinafter simply cells), and a column of output XOR gates (also not shown). The column of input XOR gates include 8 input XOR gates. First column 102 includes 7 cell 112 occupying the higher bit positions of the column, and cell 113 occupying the lowest bit position. Second column 104 includes 7 cell 114 occupying the higher bit positions of the column, and 1 cell 116 occupying the lowest bit position. Third column 106 includes 6 cell 114 occupying the higher bit positions of the column, and 2 cell 116 occupying the two lowest bit positions. Fourth column 108 includes 4 cell 114 occupying the higher bit positions of the column, and 4 cell 116 occupying the four lower bit positions. Fifth column 110 includes 8 cell 118 occupying the eight bit positions of the column. Lastly, the column of XOR gates includes 8 output XOR gates.

Still referring to FIG. 1, cells 112 and 113 of column 102 are correspondingly coupled to the input bits, i.e. $a_i$ and $b_i$. Cell 113 also receives $c_{in}$ as a third input bit. Each cell 114 of column 104 is correspondingly coupled to two cells 112/113 in column 102, one in the same bit position and another one in one lower bit position. Cell 116 of column 104 is coupled to cell 113 of column 102. Each cell 114 of column 106 is correspondingly coupled to two cells 114/116 in column 104, one in the same bit position and another one in two bit positions lower. Cells 116 of column 106 are correspondingly coupled to the lowest two cells 114/116 of column 104. Each cell 114 of column 108 is correspondingly coupled to two cells 114/116 in column 106, one in the same bit position and another one in four bit positions lower. Cells 116 of column 108 are correspondingly coupled to the lowest four cells in column 106. Each cell 118 of column 110 is correspondingly coupled to two cells 114/116 in column 108, one in the same bit position and another one in one bit position lower, except for cell 118 at the lowest bit position where the input bit from a cell 116 at one bit position lower is grounded instead. Each output XOR gate is correspondingcoupled to an input XOR gate and one cell 118 of column 110. Similar to cell 112/113, each input XOR gate is correspondingly coupled to receive the input bits, i.e. $a_i$ and $b_i$.

Cells 112/113 are used to generate the initial generate and propagate bits, $g_i$ and $p_i$, in accordance with the initial generate and propagate equations, i.e. $g_i=a_i b_i$ and $p_i=a_i \text{XOR}\ b_i$. Cell 113 takes into account the carry-in bit. Cells 114 are used to recursively generate the additional generate and propagate bits, $g_{ik}$ and $p_{ik}$, in accordance with the generate and propagate term equations, i.e. $g_{ik}=g_{j+1,k}+p_{j+1,k}\ g_{ij}$ and $p_{ik}=p_{ij}p_{j+1,k}$. Cells 116 are used to buffer the computed generate and propagate terms. Cells 118 are used to generate the carry-out bits (the carry-in bit of the i+1th bit), $c_i$, in accordance with the carry-in equation, i.e. $c_i=g_i+p_i c_{i-1}$. The sum bits, $s_i$, are generated by the output XOR gates in accordance with the sum bit equation, i.e. $s_i=p_i \text{XOR}\ c_{i-1}$.

Thus, a straight implementation of Dozza's approach require 7 columns, i.e. 2 columns of XOR gates and 5 columns of computational cells. Furthermore, the critical path includes one cell 112, three cell 114, one cell 118 and a final XOR gate.

Figure 2:
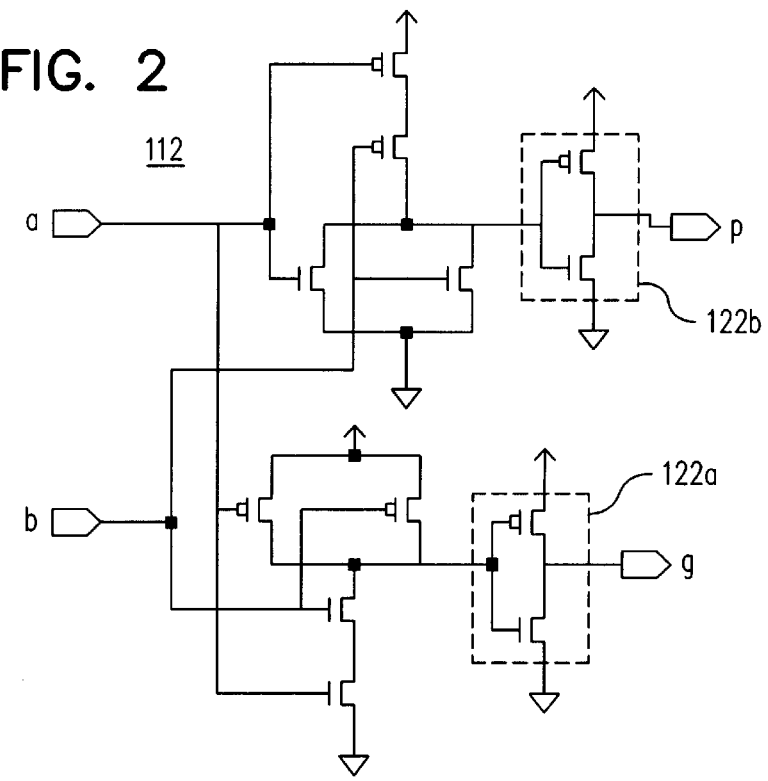
Figure 3:
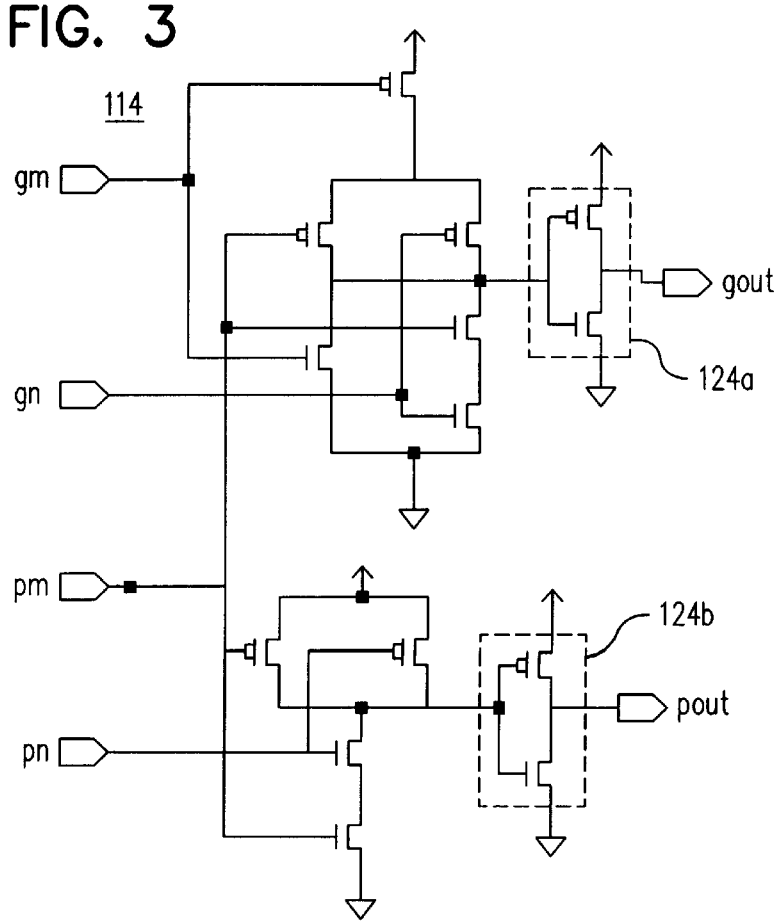
Figure 4:
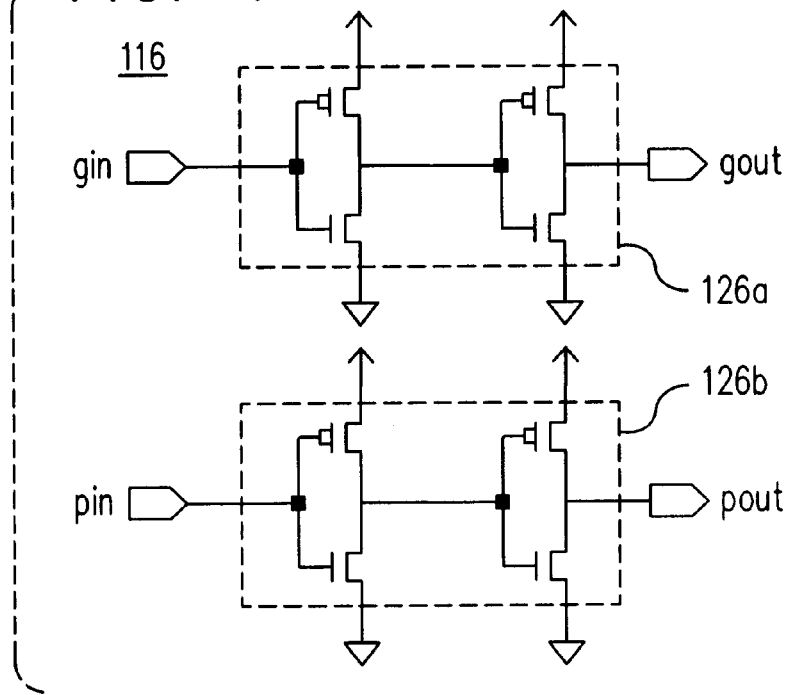
Figure 5:
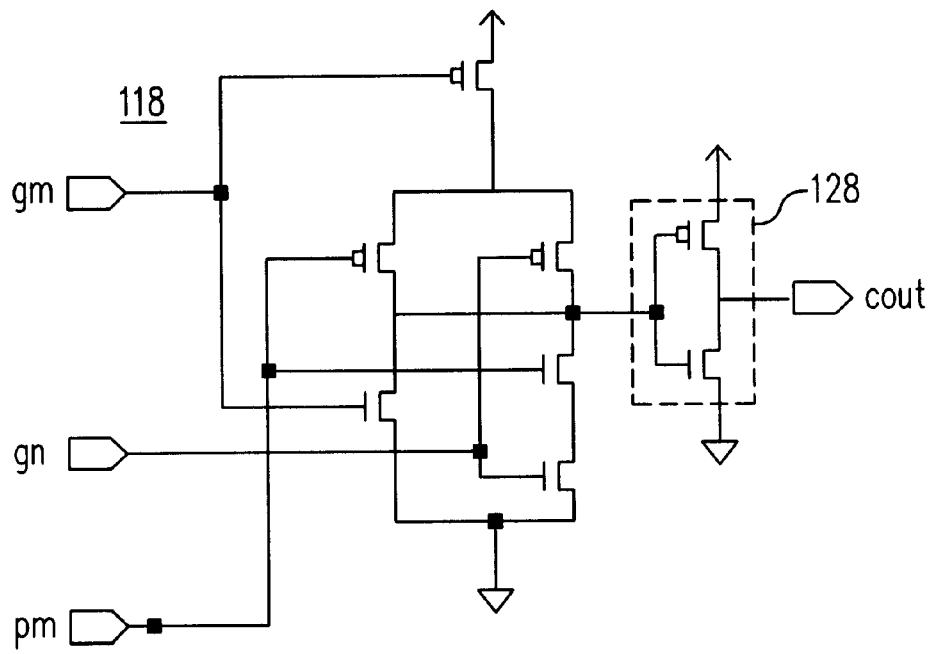

FIG. 2 illustrates one embodiment of a cell 112 used to generate the initial generate and propagate bits in accordance with the initial generate and propagate bit equations described earlier. Each cell 112 includes, in particular, inverters 122a and 122b. Cell 113 is similarly implemented, except it is based on three inputs, the third input being the carry-in bit. FIG. 3 illustrates one embodiment of a cell 114 used to generate the "recursively determined" generate and propagate bits in accordance with the generate and propagate equations. Each cell 114 also includes, in particular, inverters 124a and 124b. FIG. 4 illustrates one embodiment of a cell 116 used to buffer the computed generate and propagate terms. Each cell 116 includes, in particular, two stage buffers 126a and 126b. FIG. 5 illustrates one embodiment each of a cell 118 used to generate the carry-out bits in accordance with the carry-in equation. Each cell 118 includes, in particular, inverter 128.

Figure 6:
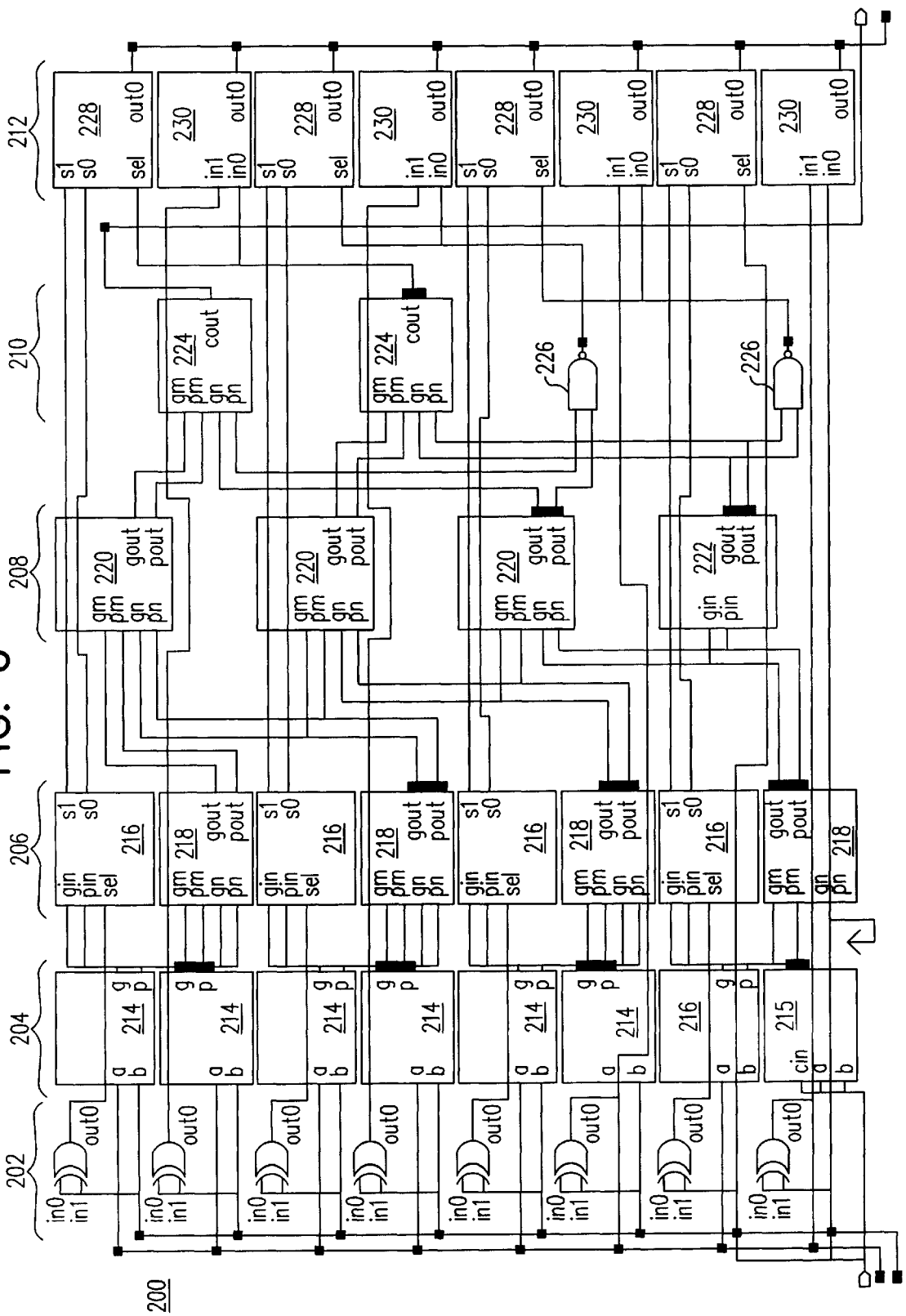

Referring now FIGS. 6–15, wherein ten diagrams are shown illustrating a corresponding 8-bit embodiment of a parallel adder in accordance with the teachings of the present invention. As shown in FIG. 6, 8-bit parallel adder 200 implemented in accordance with the present invention includes a column of input XOR gates 202 and five columns of cells, columns 204–212. Second column 204 includes 7 cell 214 occupying the higher bit positions of the column, and cell 215 occupying the lowest bit position of the column. Third column 206 includes 4 cell 216 occupying the even bit positions of the column, and 4 cell 218 occupying the odd bit positions of the column. Fourth column 208 includes 3 cell 220 occupying the higher order positions of the column, and 1 cell 222 occupying the lowest order position of the column. Fifth column 210 includes 2 cell 224 occupying the higher order positions of the column, and 2 NAND gates 226 occupying the lower order positions of the column. Lastly, sixth column 212 includes 4 cell 228 occupying the even output bit positions of the column, and 4 cell 230 occupying the odd output bit positions of the column.

Still referring to FIG. 6, each input XOR gate is correspondingly coupled to receive the input bits, i.e. $a_i$ and $b_i$. Each cell 214/215 of column 204 is also correspondingly coupled to the input bits $a_i$ and $b_i$. Cell 215 of column 204 is also coupled to the carry-in bit, $c_{in}$. Each cell 216 of column 206 is correspondingly coupled to an input XOR gate of the same bit position, and a cell 214 of column 204 in one bit position lower. Each cell 218 of column 206 is correspondingly coupled to one cell 214/215 of the same bit position, and a cell 214/215 in one bit position higher, both of column 204. Each cell 220 of column 208 is correspondingly coupled to one cell 218 of one bit position lower and one cell 218 of three bit positions lower, both of column 206. Cell 222 of column 208 is coupled to the lowest order cell 218 of column 206. The highest order cell 224 of column 210 is coupled to the highest order cell 220 and cell 220 of two bit positions lower, both of column 208. The lowest order cell 224 of column 210 is coupled to the next highest order cell 220 and cell 222, both of column 208. The higher order NAND gate 226 of column 210 is coupled to the lowest order cell 220 of column 208, and the lower order NAND gate 226 of column 210 is coupled to cell 222 of column 208. Cells 228 of column 212 are correspondingly coupled to cell 216 of column 206 and selectively coupled to either one of cell 224, one of the NAND gates 226, or $c_{in}$. Each cell 230 of column 212 is coupled to one of the input XOR gates for one of the inputs, and selectively to either one of cell 224, one of the NAND gates 226, or $c_{in}$ for the other input.

Cells 214/215 are used to generate the initial generate and propagate bits in accordance with the generate and propagate equations as described earlier. Cells 218 and 220 are used to generate the "recursively determined" generate and propagate terms in accordance with the recursive generate and propagate equations as described earlier for the odd input bits. Cells 224 and NAND gates 226 are used to generate the carry-out bits, which serve as one of the potential output sum bits for the odd output bits. Additionally, the carry-out bits in conjunction with the input carry-in bit are used to select the appropriate output for even output bits. Cells 216 are used to generate two potential sum outputs for the even output bits.

In one embodiment, partial column 208 and partial column 210 are merged to form one physical column. Thus, the present invention requires only 5 columns, one column of input XOR gate and 4 columns of computational cells, which is one column less than the straight implementation. Additionally, the critical path includes one cell 214, one cell 218, one cell 220, one cell 224 and either one cell 228 or one cell 230, which is one cell less than the critical path of the straight implementation. Moreover, cells 228 and cells 230 are independent of each other. In other words, the generation of the odd and even output bits may be performed in parallel. Those skilled in the art will appreciate that these are significant space as well as performance improvement over the straight implementation.

Figure 7:
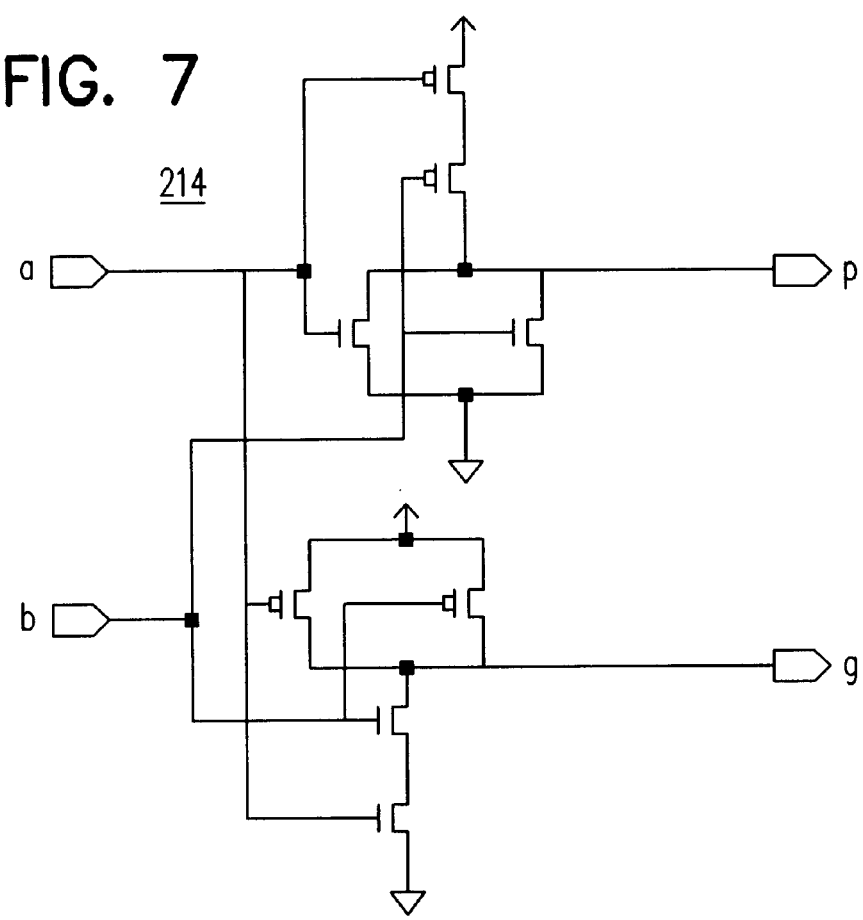
FIGS. 7–15 illustrate a corresponding 8-bit embodiment of a parallel adder in accordance with the teachings of the present invention, including also an architectural view and detailed views of the various cells.
Figure 8:
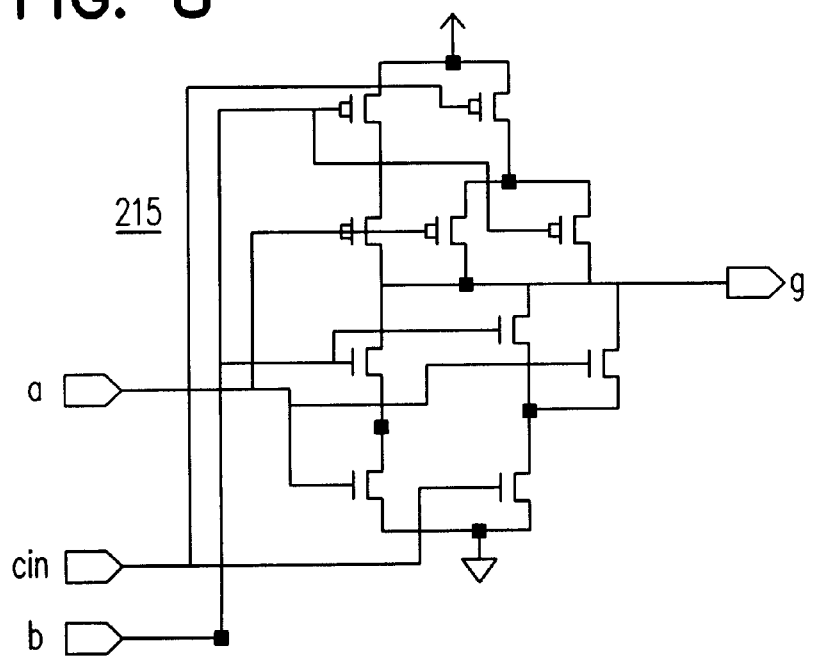

FIG. 7 illustrates one embodiment of cell 214. Similar to cell 112, each cell 214 is used to generate the initial generate and propagate bits, $g_i$ and $p_i$, in accordance with the initial generate and propagate equations, i.e. $g_i=a_i b_i$ and $p_i=a_i \text{ XOR }\ b_i$. However, cell 214 differs from cell 112 in that inverters 122a and 122b are eliminated. FIG. 8 illustrates one embodiment of cell 215, which is similarly implemented as cell 214, except it does not have to compute $p_i$, and it factors in the carry-in bit when computing $g_i$. Cell 215 also does not include an output inverter for the generate bit.

Figure 9:
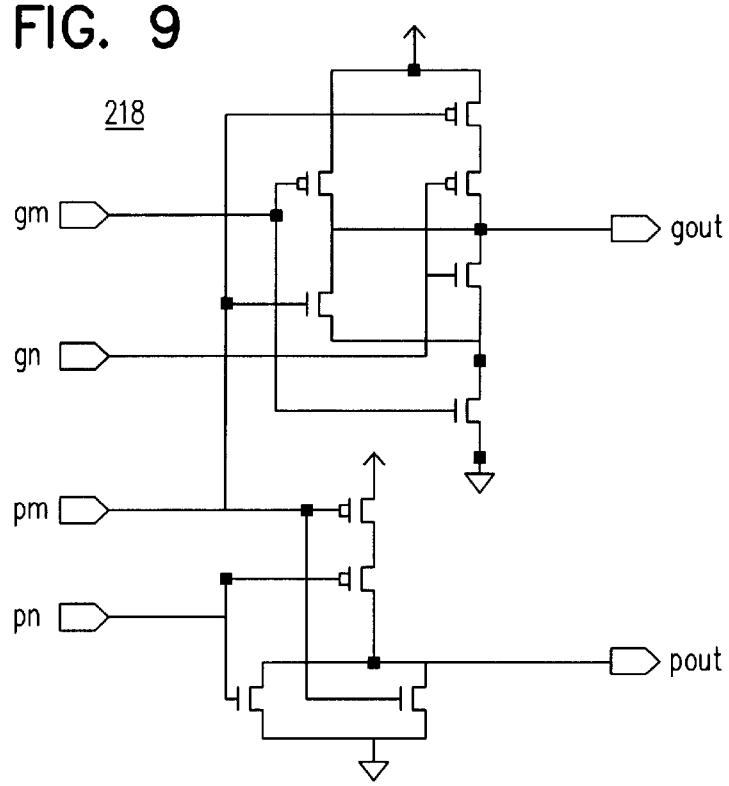
Figure 10:
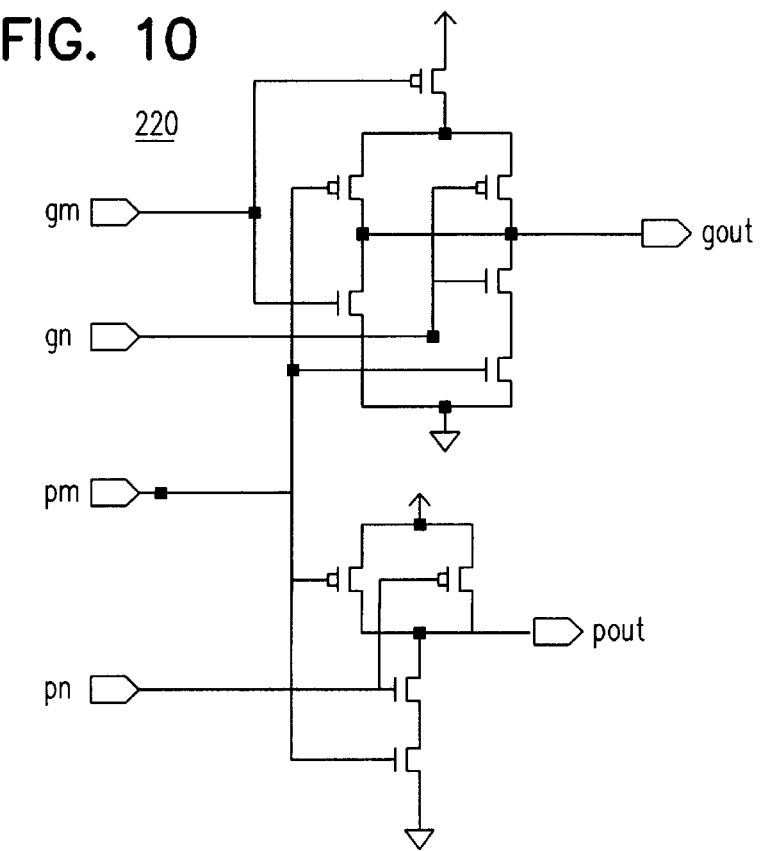
Figure 11:
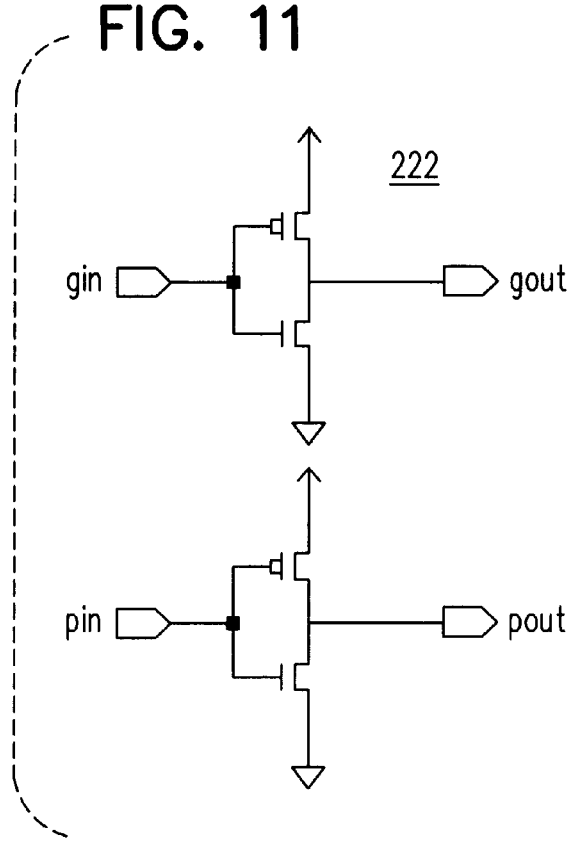

FIGS. 9 and 10 illustrate one embodiment each of cell 218 and cell 220. Similar to cell 114, each cell 218 or 220 is used to generate the recursively determined generate and propagate bits, $g_{ik}$ and $p_{ik}$, in accordance with the generate and propagate equations, i.e. $g_{ik}=g_{j+1,k}+p_{j+1,k}g_{ij}$ and $p_{ik}=p_{ij}p_{j+1,k}$. However, neither cell 218 nor cell 220 include inverters 124a and 124b. Moreover, cells 218 are deployed for the odd bits only. As a result, cells 220 are deployed as a subsequent stage for cells 218 for the three higher odd bit positions only. FIG. 11 illustrates one embodiment of cell 222. Similar to cell 116, cell 222 is used to buffer the computed generate and propagate terms. However, unlike cell 116, a single stage buffer is used instead.

Figure 12:
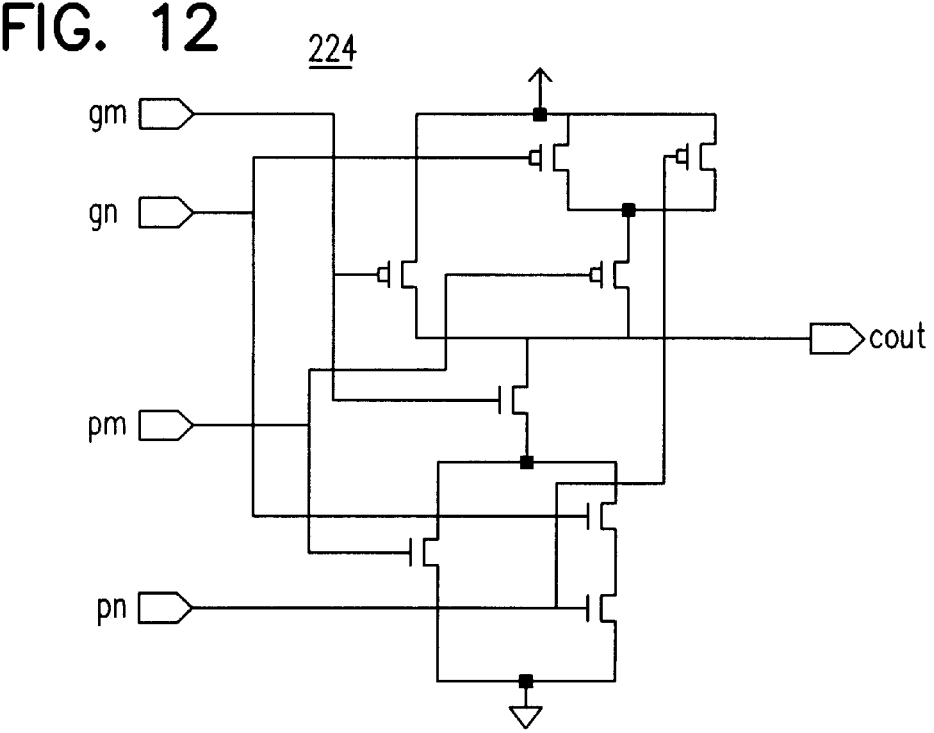
Figure 13:
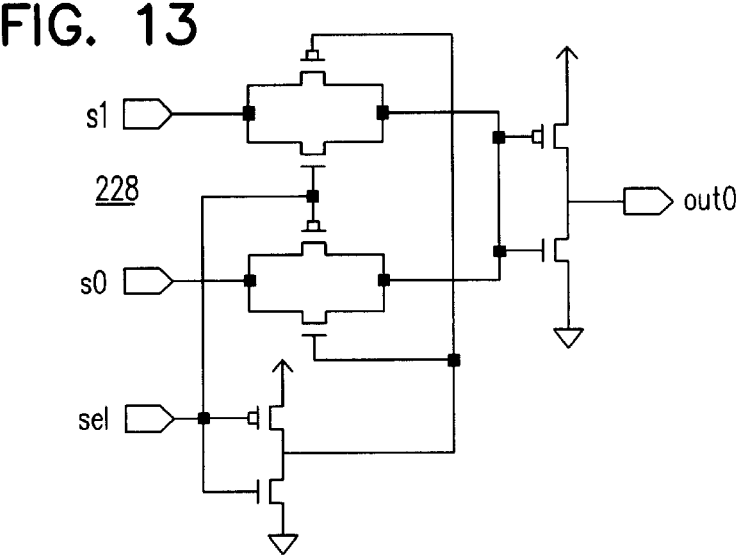

FIG. 12 illustrates one embodiment of cell 224. Similar to cells 118, each cell 224 is used to generate the "carry-out bit", $c_i$, in accordance with the carry-in equation, i.e. $c_i=g_i+p_ic_{i-1}$. While the higher order carry-out bit is output as the carry-out bit of the result as in the case of the highest order cell 118, unlike the lower order cells 118, the lower order carry-out bit is not provided to output XOR gates, instead it is used as a select bit to select the appropriate output for the highest even output bit. Similarly, the output of NAND gates 226 are used to select the appropriate outputs for the next two highest even output bits. The lowest even output bit is selected by the carry-in bit. Also unlike cells 118, cell 224 includes output inverter 128/130. FIG. 13 illustrates one embodiment of cell 228.

Figure 14:
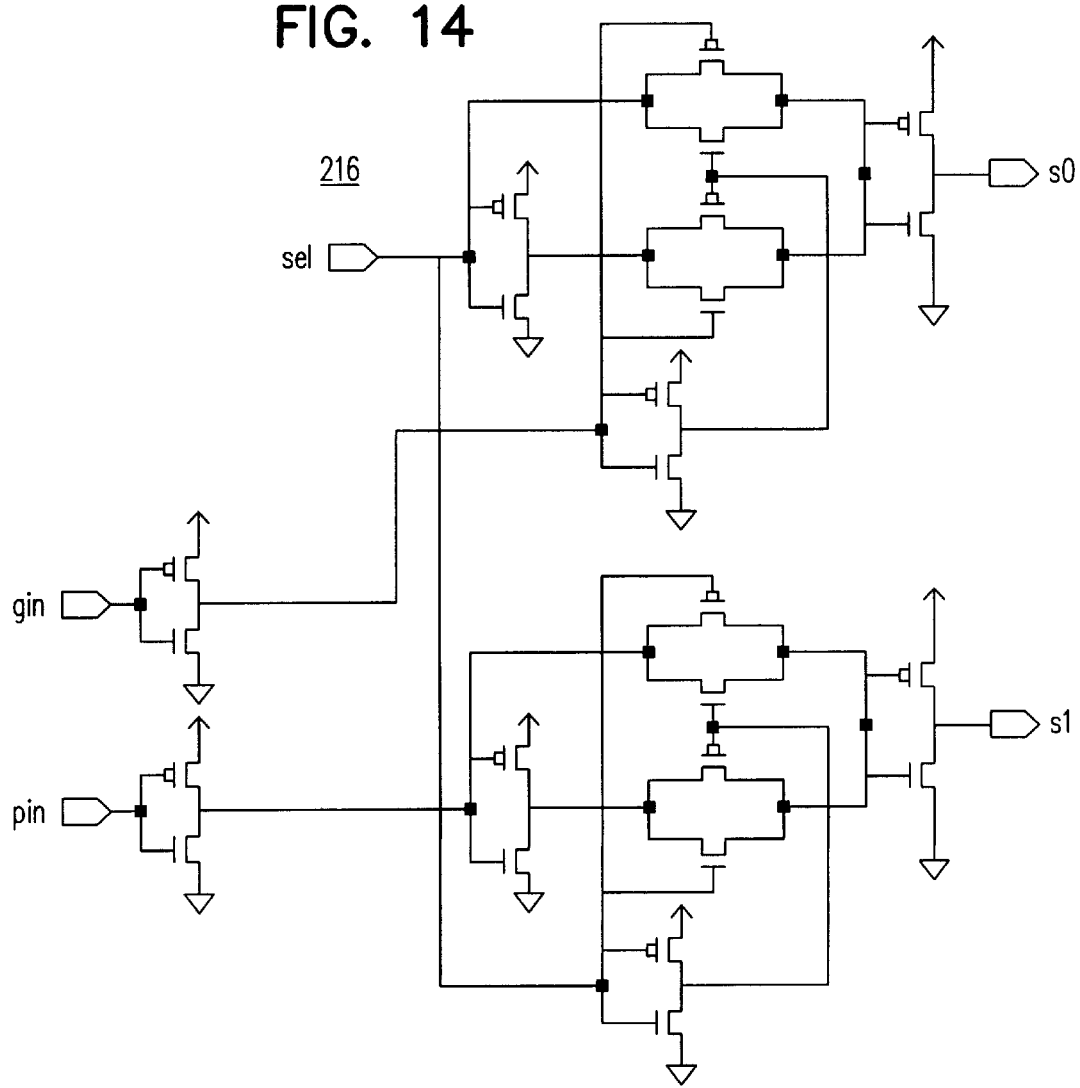
Figure 15:
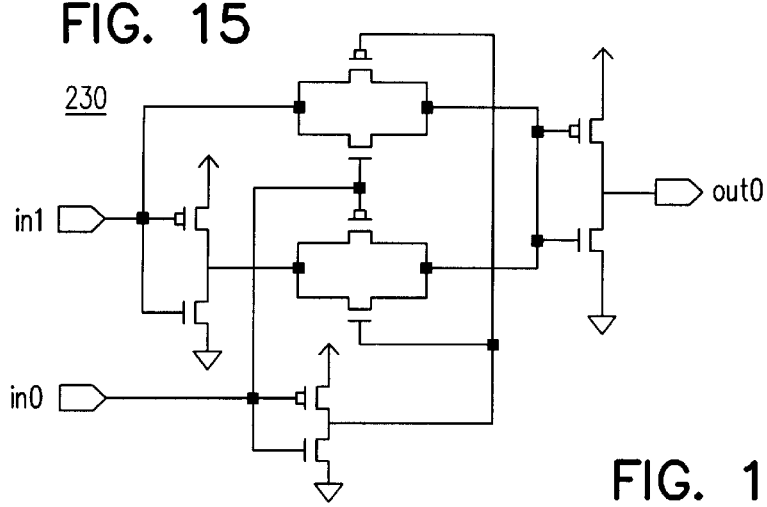

FIG. 14 illustrates one embodiment of cell 216. Instead of generating the recursively determined generate and propagate terms, each cell 216 generates two potential sum bits based on the $g_i$ and $p_i$ outputs of a cell 214 occupying one bit position lower, and the output of the input XOR gate of the same bit position. FIG. 15 illustrates one embodiment of cell 230.

Those skilled in the art will also appreciate that the elimination of the inverters in the above described embodiments further improves the relative performance of the corresponding cells over the straight implementation.

Figure 16:
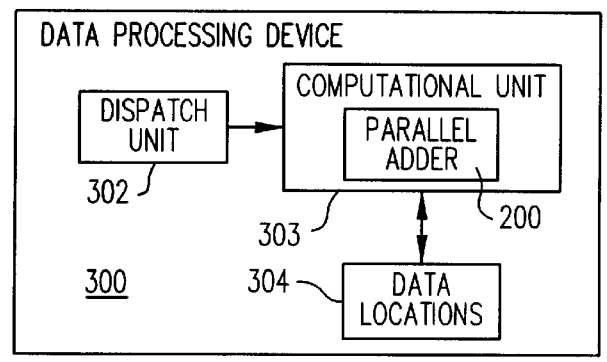
FIG. 16 illustrates a digital data processing device incorporated with the parallel adder of the present invention.

Turning now to FIG. 16, wherein one embodiment of a data processing device incorporated with the parallel adder of the present invention is shown. As illustrated, data processing device 300 includes dispatch unit 302, computational unit 303 and data storage 304 coupled to each other as shown. Computational unit 303 includes in particular parallel adder 200 of the present invention. Dispatch unit 302 dispatches instructions to computational unit 303, which in response performs the computations, using parallel adder 200 as appropriate and selectively retrieving the input operands and storing the output results from and to data storage 304 as instructed. Dispatch unit 302, computational unit 303 (except for parallel adder 200) and data storage 304 are intended to represent a broad range of such elements known in the art. In fact, data processing device 300 is intended to represent a broad range of such devices known in the art, including but not limited to microcontrollers, graphics accelerator, digital signal processors, audio and/or video signal processors, general purpose microprocessors, and so forth.

Figure 17:
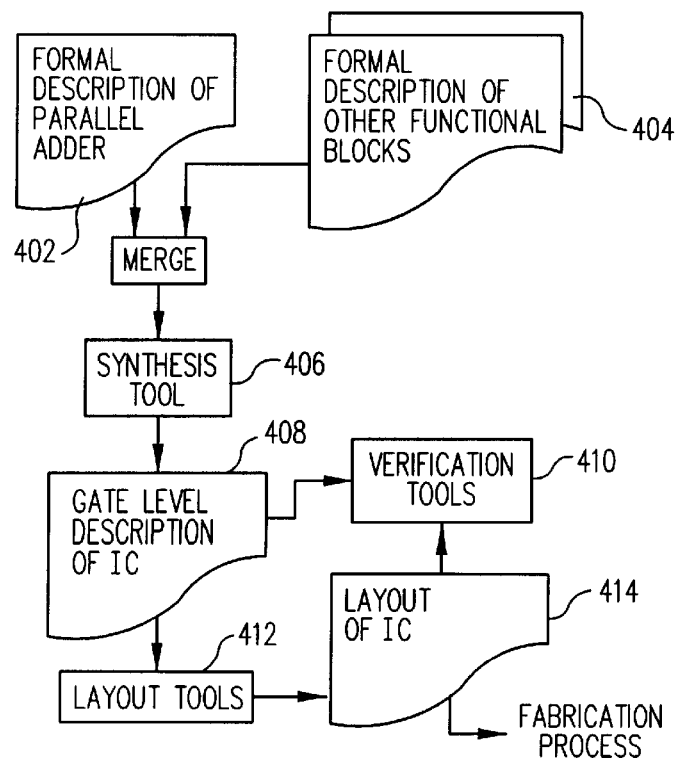
FIG. 17 illustrates one embodiment of a method for making an integrated circuit that includes the parallel adder of the present invention.

FIG. 17 illustrates one embodiment of a design process for designing a data processing device incorporated with the innovative parallel adder of the present invention is shown. As illustrated, a formal description 402 of the parallel is prepared. Formal description 402 may be prepared in any one of the formal integrated circuit (IC) description languages known in the art, e.g., Very High Speed Integrated Circuit (VHSIC) Description Language, or VHDL, Verilog, and the like, using any one of a number of known design description editors supporting the desired formal description language.

Formal description 402 is then optionally merged with formal descriptions 404 of other function blocks of the IC, if the parallel adder is to be fabricated as an integral part of a "larger" IC. Formal description 402, or the merged formal descriptions 402 and 404, are then provided to synthesis tools 406 to synthesize, i.e. to generate, a gate-level description 408 of the IC to be fabricated. Formal description 402 is provided to synthesis tools 406 in a manner that allows the special design of the combined adder-shifter of the present invention to be directly incorporated into gate-level description 408, subsituting for the conventional implementations that would have been otherwise synthesized for the parallel adder by synthesis tools 406. The gate-level description 408 may then be used by a number of verification tools 410, such as simulators or emulators, to verify the correctness of the design. An example of a verification tool is the SimExpress™ emulator product manufactured by Meta System of Saclay, France, a wholly owned subsidiary of the assignee of the present invention.

Upon verification, or in parallel, gate-level description 408 of the IC is then provided to layout tools 412 to generate physical layout description 414 of the IC. Layout description 414 is also subjected to verification by layout level ones of verification tools 410. An example of layout level verification is parasitic analysis for submicron level integration. Upon verification, layout description 414 of the IC is then provided to the fabrication process to fabricate the desired IC.

Those skilled in the art will appreciate that the design process and the fabrication process may be performed by different parties. In fact, the creation of formal description 402 may be performed by a party independent of the party or parties who prepare formal descriptions 404 for the other function blocks, and/or the party or parties who perform the synthesis, verifications, etc. Formal description 402 may be provided to these other parties via any one of a number of known data transfer methods, e.g. through removable storage medium such as magnetic tape, compact disk (CD), digital versatile disk (DVD), and the like, or through networked data communication links. In this context, formal description 402 is often referred to as a "soft core".

While the parallel adder of the present invention has been described in terms of the above illustrated embodiment, those skilled in the art will recognize that the invention is not limited to the embodiment described. The present invention can be practiced with modification and alteration within the spirit and scope of the appended claims. The description is thus to be regarded as illustrative instead of restrictive on the present invention.

Thus, a parallel adder with independent odd and even sum bit generation cells has been described.

What is claimed is:

1. A parallel adder comprising:
   a first plurality of computational cells that operate to generate odd sum bits from inputs based on generate and propagate terms recursively computed and a plurality of carry-in bits;
   a plurality of selection cells that are independent of the first plurality of computational cells and operate to select and output even sum bits from a plurality of candidate sum bits, the selection capable of being made in accordance with predetermined ones of said recursively computed generate and propagate terms;
   a second plurality of computational cells selectively coupled to the first plurality of computational cells and said plurality of selection cells that operate to recursively compute said generate and propagate terms from initial ones of said generate and propagate terms; and a third plurality of computational cells selectively coupled to said plurality of selection cells that operate to compute said candidate sum bits from initial ones of said generate and propagate terms and a plurality of select inputs, wherein the initial ones of said generate and propagate terms are provided to the second and third pluralities of computational cells by a fourth plurality of computational cells.

2. The parallel adder of claim 1, wherein the fourth plurality of computational cells are selectively coupled to the second plurality of computational cells and operate to compute said initial ones of said generate and propagate terms from a number of input bits.

3. The parallel adder of claim 1, wherein the parallel adder further comprises a plurality of input XOR gates selectively coupled to the first plurality of computational cells that operate to generate said carry-in bits from a number of input bits.

4. The parallel adder of claim 1, wherein the fourth plurality of computational cells are selectively coupled to the third plurality of computational cells and operate to compute said initial ones of said generate and propagate terms from a number of input bits.

5. The parallel adder of claim 1, wherein the parallel adder further comprises a plurality of input XOR gates selectively coupled to the third plurality of computational cells that operate to generate said select inputs from a number of input bits.

6. A storage medium having stored therein a plurality of machine readable instructions, which when executed by a processor, cause the processor to effect the following:

formally describe a parallel adder for use in a fabrication process to fabricate an integrated circuit including at least the parallel adder; and formally describe the parallel adder to include:
- a first plurality of computational cells designed to operate to generate odd sum bits from inputs based on generate and propagate terms recursively computed and a plurality of carry-in bits;
- a plurality of selection cells designed to be independent of the first plurality of computational cells and operate to select and output even sum bits from a plurality of candidate sum bits, the selection capable of being made in accordance with predetermined ones of said recursively computed generate and propagate terms;
- a second plurality of computational cells selectively coupled to the first plurality of computational cells and said plurality of selection cells and designed to operate to recursively compute said generate and propagate terms from initial ones of said generate and propagate terms; and
- a third plurality of computational cells selectively coupled to said plurality of selection cells and designed to operate to compute said candidate sum bits from initial ones of said generate and propagate terms and a plurality of select inputs, wherein the initial ones of said generate and propagate terms are designed to be provided to the second and third pluralities of computational cells by a fourth plurality of computational cells.

7. The storage medium of claim 6, wherein the fourth plurality of computational cells are selectively coupled to the second plurality of computational cells and are designed to operate to compute said initial ones of said generate and propagate terms from a number of input bits.

8. The storage medium of claim 6, wherein the parallel adder further comprises a plurality of input XOR gates selectively coupled to the first plurality of computational cells that are designed to operate to generate said carry-in bits from a number of input bits.

9. The storage medium of claim 6, wherein the fourth plurality of computational cells are selectively coupled to the third plurality of computational cells and are designed to operate to compute said initial ones of said generate and propagate terms from a number of input bits.

10. The storage medium of claim 6, wherein the parallel adder further comprises a plurality of input XOR gates selectively coupled to the third plurality of computational cells that are designed to operate to generate said select inputs from a number of input bits.

11. An apparatus comprising:

an instruction dispatch unit that operates to dispatch instructions; and a computational unit coupled to the instruction dispatch unit that operates to execute the dispatched instructions, the computational unit including a parallel adder having
- a first plurality of computational cells designed to operate to generate odd sum bits for operands of the dispatched instructions from inputs based on generate and propagate terms recursively computed and a plurality of carry-in bits;
- a plurality of selection cells designed to be independent of the first plurality of computational cells and operate to select and output even sum bits for the operands of the dispatched instructions from a plurality of candidate sum bits, the selection being made in accordance with predetermined ones of said recursively computed generate and propagate terms;
- a second plurality of computational cells selectively coupled to the first plurality of computational cells and said plurality of selection cells and designed to operate to recursively compute said generate and propagate terms from initial ones of said generate and propagate terms; and
- a third plurality of computational cells selectively coupled to said plurality of selection cells and designed to operate to compute said candidate sum bits from initial ones of said generate and propagate terms and a plurality of select inputs, wherein the initial ones of said generate and propagate terms are designed to be provided to the second and third pluralities of computational cells by a fourth plurality of computational cells.

12. The apparatus of claim 11, wherein the fourth plurality of computational cells are selectively coupled to the second plurality of computational cells and are designed to operate to compute said initial ones of said generate and propagate terms from a number of input bits of the operands.

13. The apparatus of claim 11, wherein the parallel adder further comprises a plurality of input XOR gates selectively coupled to the first plurality of computational cells that are designed to operate to generate said carry-in bits from a number of input bits of the operands.

14. The apparatus of claim 11, wherein the fourth plurality of computational cells are selectively coupled to the third plurality of computational cells and are designed to operate to compute said initial ones of said generate and propagate terms from a number of input bits of the operands.

15. The apparatus of claim 11, wherein the parallel adder further comprises a plurality of input XOR gates selectively coupled to the third plurality of computational cells that are designed to operate to generate said select inputs from a number of input bits of the operands.

* * * * *